US011003022B2

(12) United States Patent
Kim et al.

(10) Patent No.: US 11,003,022 B2
(45) Date of Patent: May 11, 2021

(54) DISPLAY DEVICE

(71) Applicant: LG ELECTRONICS INC., Seoul (KR)

(72) Inventors: Donghyun Kim, Seoul (KR); Yanghyun Kim, Seoul (KR); Myungwhun Chang, Seoul (KR); Jonggon Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/970,612

(22) PCT Filed: May 10, 2018

(86) PCT No.: PCT/KR2018/005391
§ 371 (c)(1),
(2) Date: Aug. 17, 2020

(87) PCT Pub. No.: WO2019/164063
PCT Pub. Date: Aug. 29, 2019

(65) Prior Publication Data
US 2021/0088852 A1 Mar. 25, 2021

(30) Foreign Application Priority Data
Feb. 26, 2018 (KR) .................. 10-2018-0022826

(51) Int. Cl.
*G02F 1/13357* (2006.01)
*G02F 1/1335* (2006.01)

(52) U.S. Cl.
CPC .. *G02F 1/133608* (2013.01); *G02F 1/133605* (2013.01); *G02F 1/133613* (2021.01)

(58) Field of Classification Search
CPC ......... G02F 1/133608; G02F 1/133605; G02F 1/133613
See application file for complete search history.

(56) References Cited

U.S. PATENT DOCUMENTS

| 2004/0218388 A1* | 11/2004 | Suzuki .............. G02F 1/133603 362/231 |
| 2012/0086886 A1* | 4/2012 | Mouri .............. G02F 1/133609 349/61 |
| 2016/0091759 A1 | 3/2016 | Lu et al. |

FOREIGN PATENT DOCUMENTS

| CN | 101994951 | 3/2013 |
| CN | 203349160 | 12/2013 |

(Continued)

OTHER PUBLICATIONS

PCT International Application No. PCT/KR2018/005391, International Search Report dated Nov. 14, 2018, 3 pages.

*Primary Examiner* — Anabel Ton
(74) *Attorney, Agent, or Firm* — Lee, Hong, Degerman, Kang & Waimey PC

(57) ABSTRACT

A display device is disclosed. The display device includes a display panel; a first substrate positioned in a rear of the display panel; a second substrate positioned in the rear of the display panel and adjacent to the first substrate; a plurality of first light sources mounted on the first substrate and configured to provide light to the display panel; a plurality of second light sources mounted on the second substrate and configured to provide light to the display panel; and a first reflective sheet positioned on the first substrate, the first reflective sheet including a plurality of first holes formed corresponding to positions of the plurality of first light sources, wherein in the plurality of first holes, an area of a first hole formed corresponding to a position of a first light source close to a boundary of the first substrate and the second substrate may be greater than an area of a second hole formed corresponding to a position of a second light source far from the boundary of the first substrate and the second substrate.

10 Claims, 14 Drawing Sheets

(56) References Cited

FOREIGN PATENT DOCUMENTS

| JP | 2011248120 | | | 12/2011 | | |
|---|---|---|---|---|---|---|
| KR | 20100027023 | | | 3/2010 | | |
| KR | 20100027023 | A | * | 3/2010 | ....... | G02F 1/133605 |

* cited by examiner

[Figure 1]
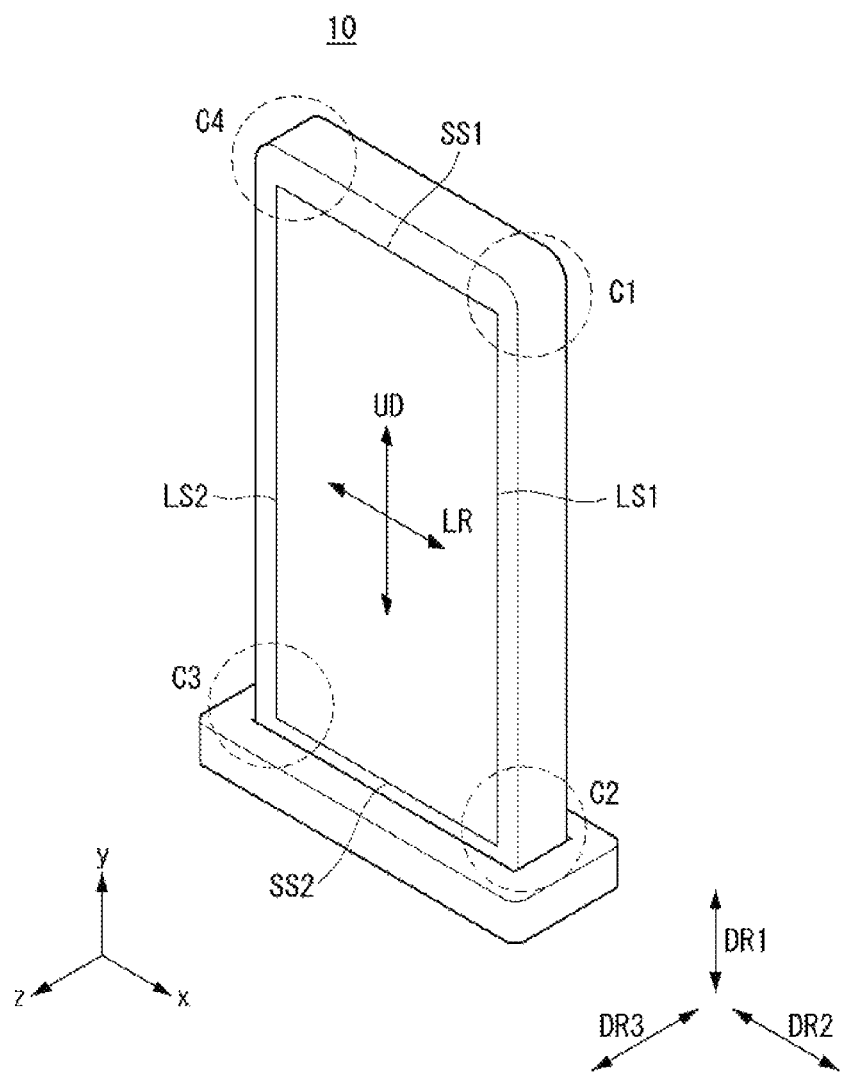

[Figure 2]
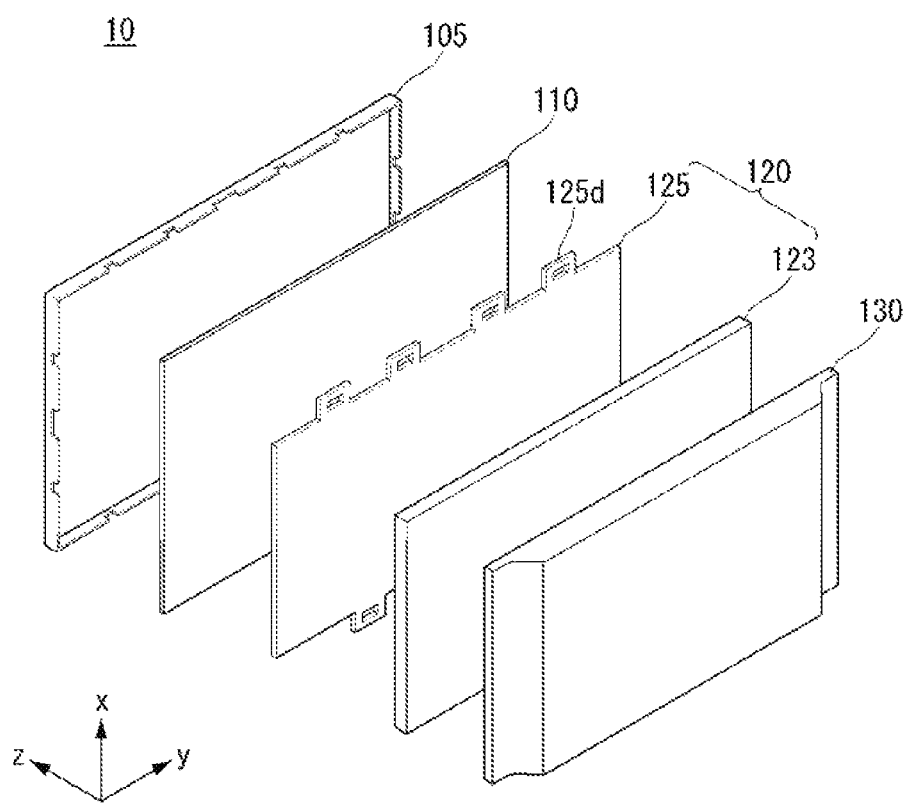

【Figure 3】
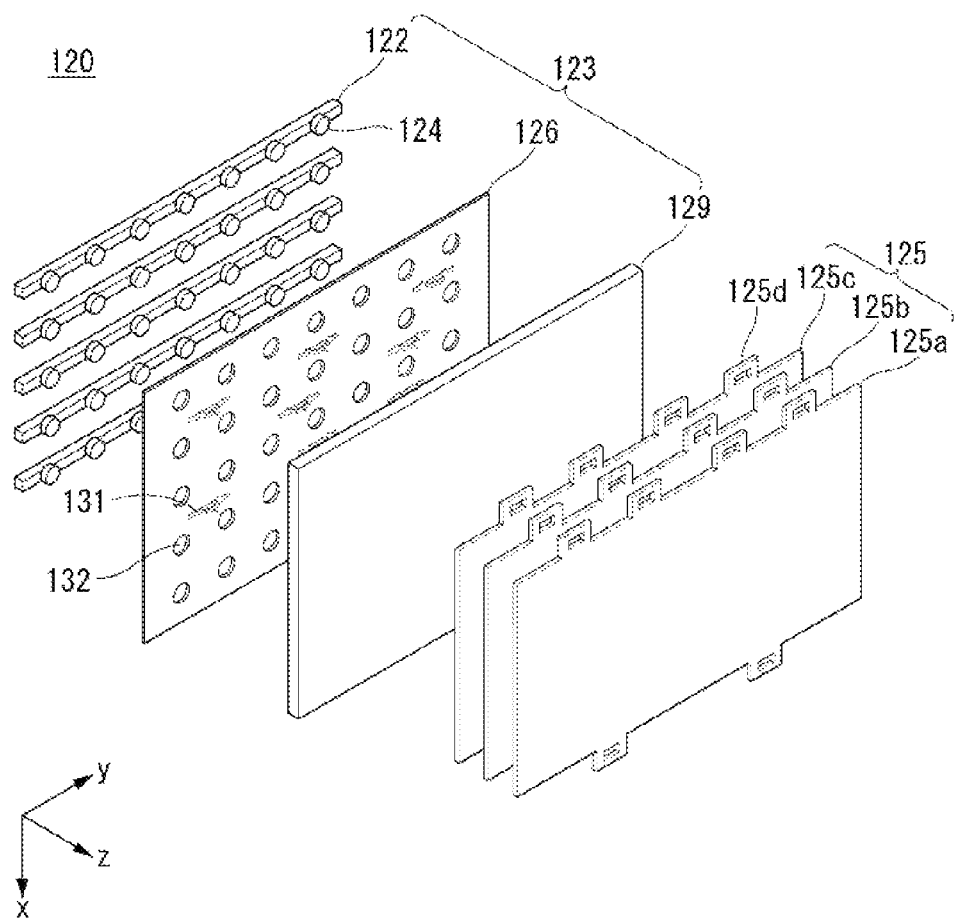
【Figure 4】
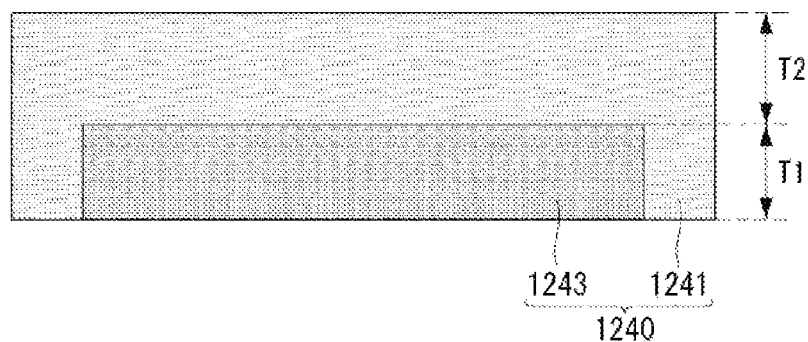

[Figure 5]
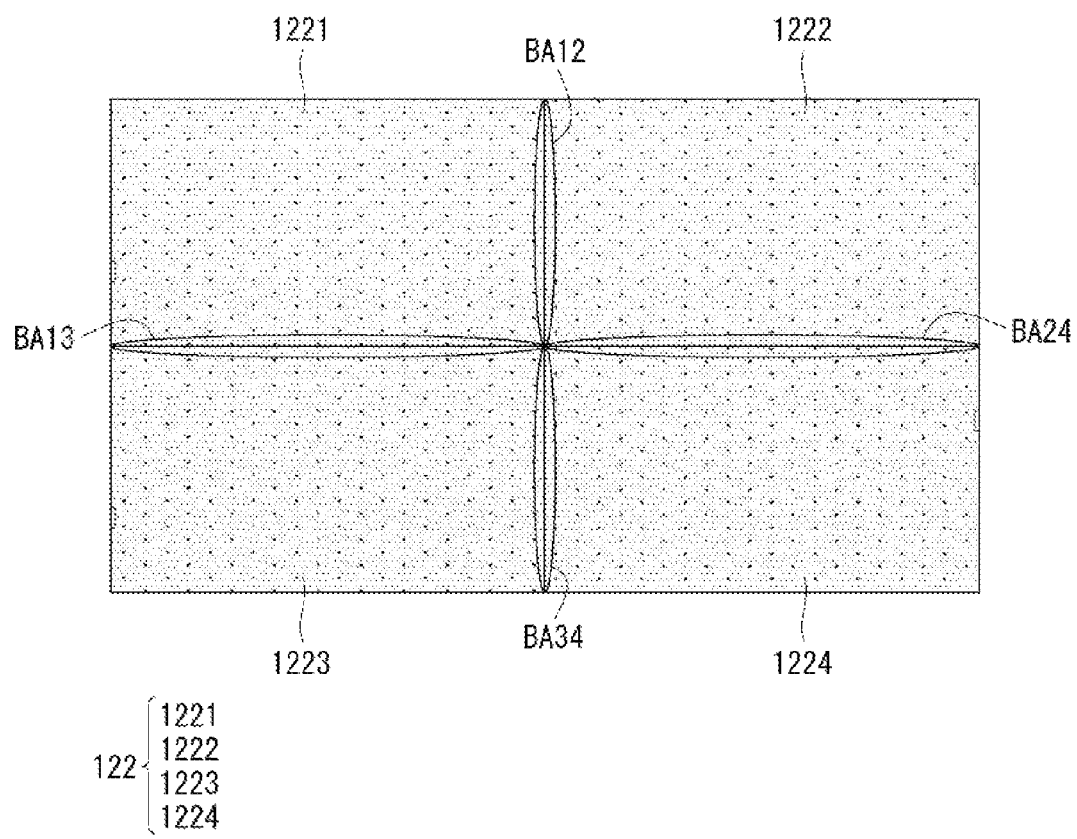

[Figure 6]
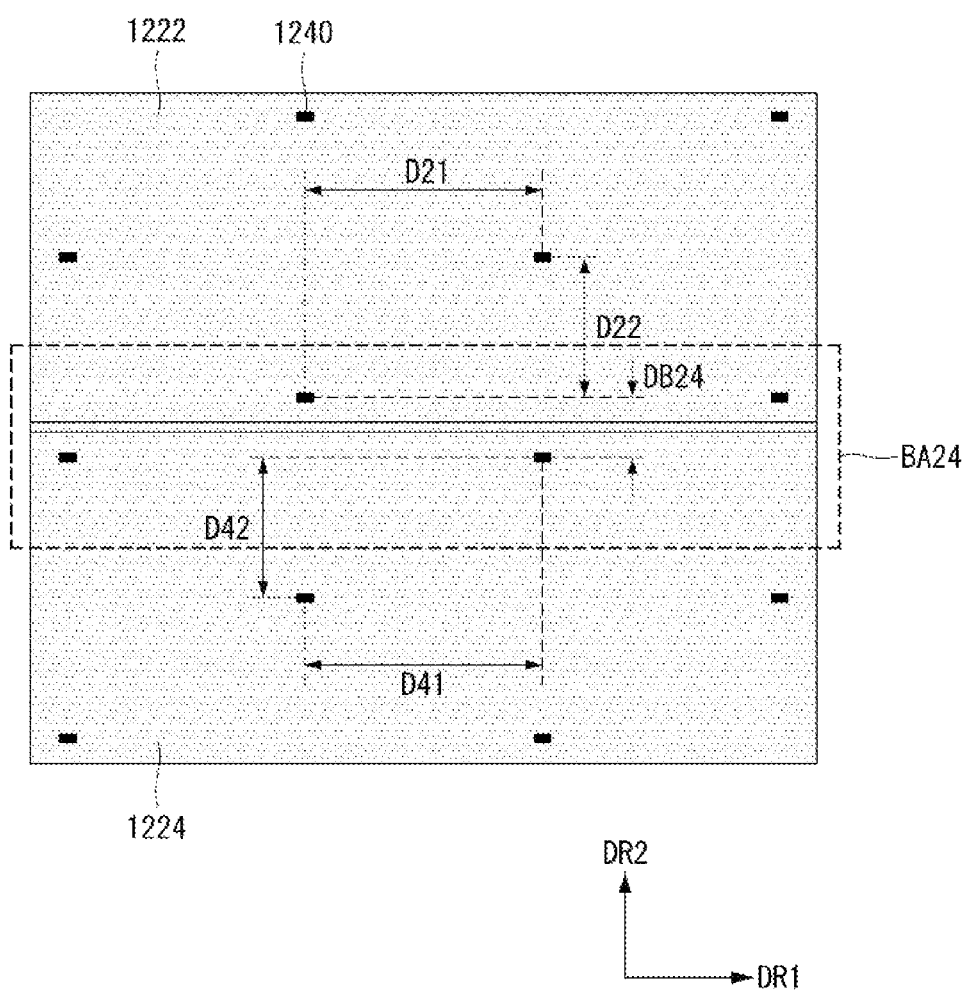

【Figure 7】
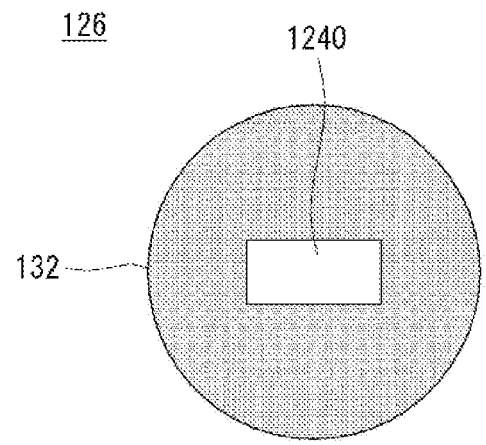
【Figure 8】
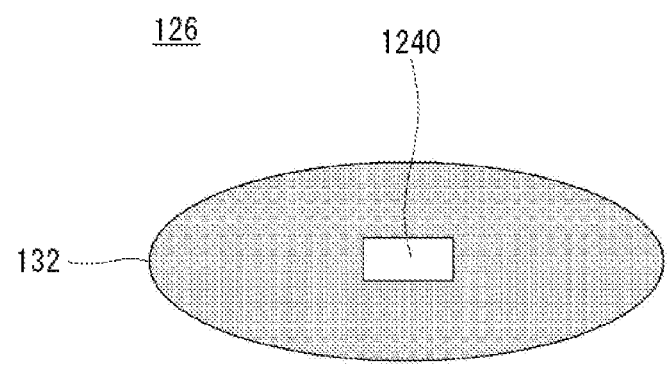

[Figure 9]
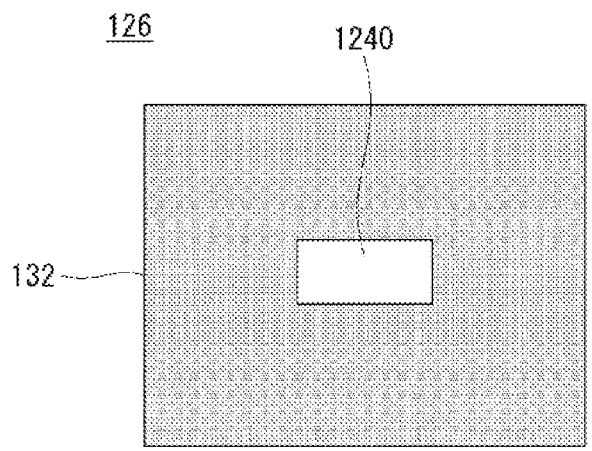
[Figure 10]
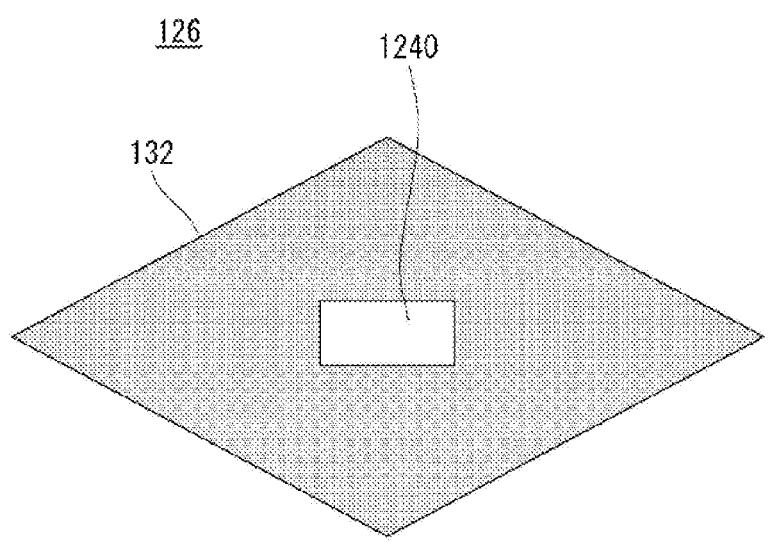

[Figure 11]
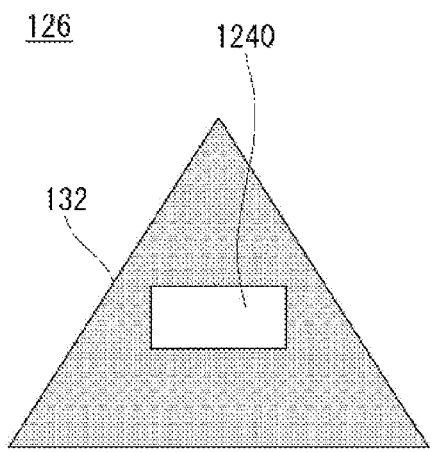
[Figure 12]
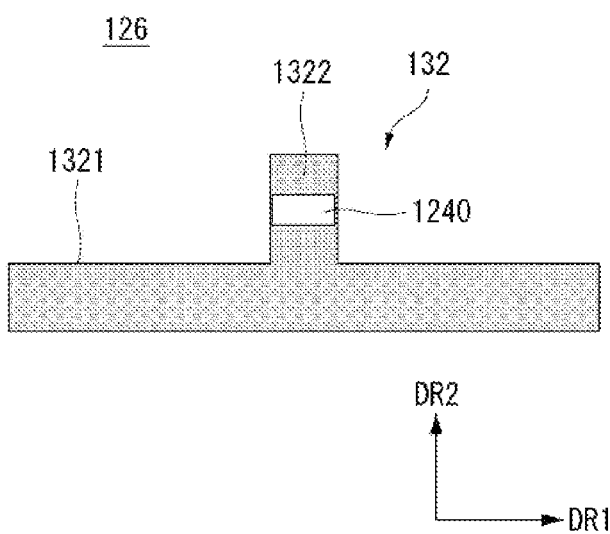

[Figure 13]
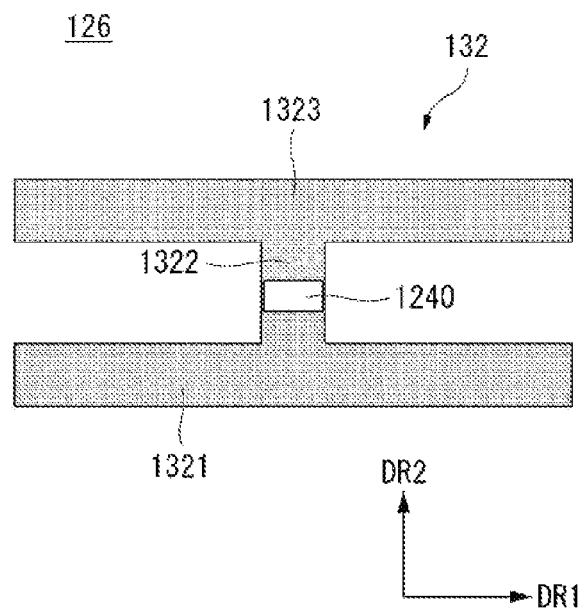
[Figure 14]
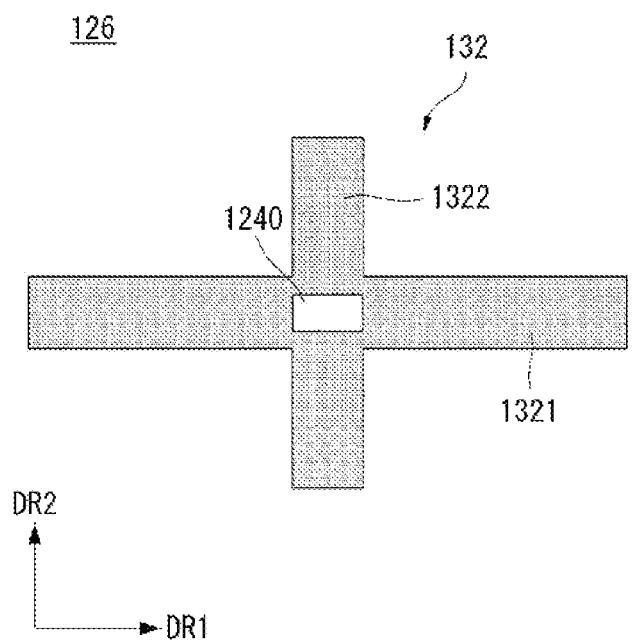

【Figure 15】
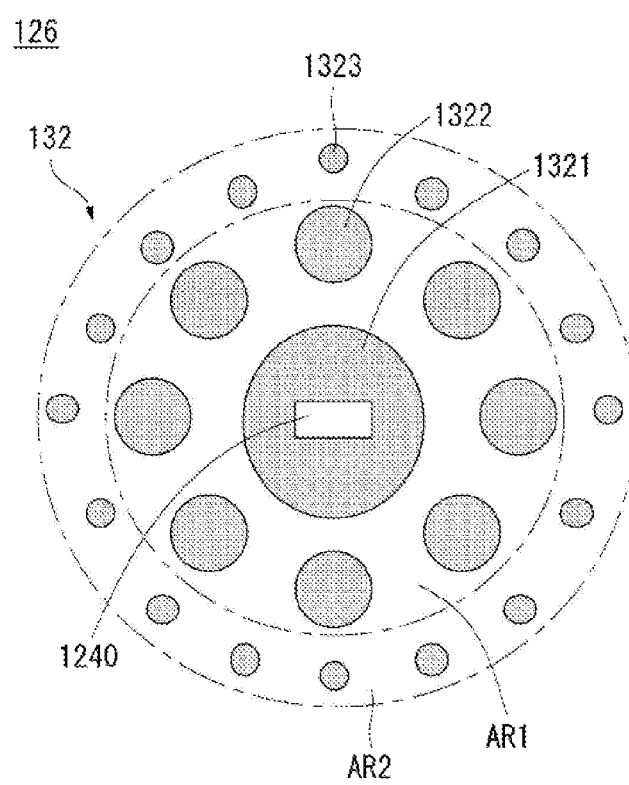

【Figure 16】
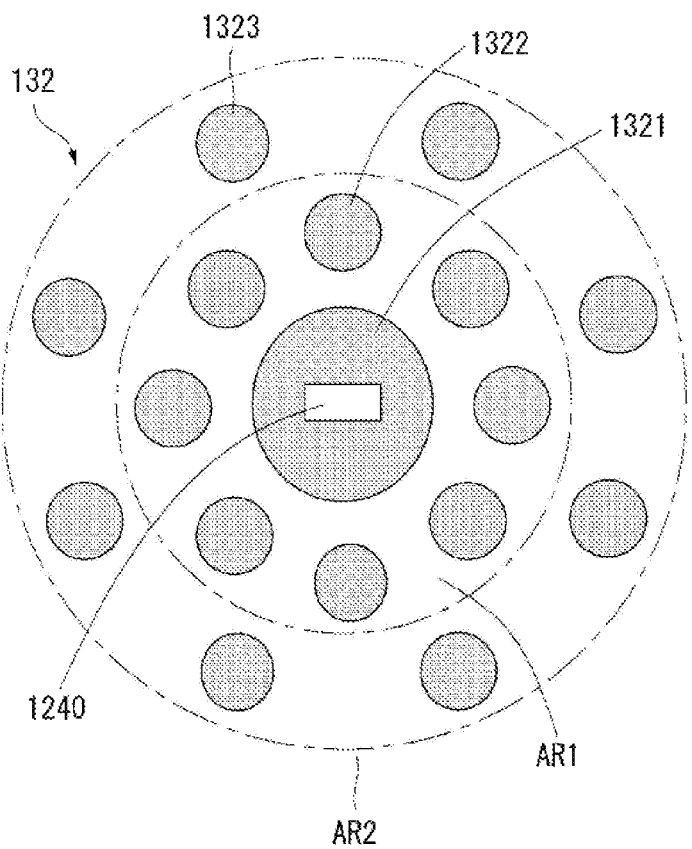

【Figure 17】
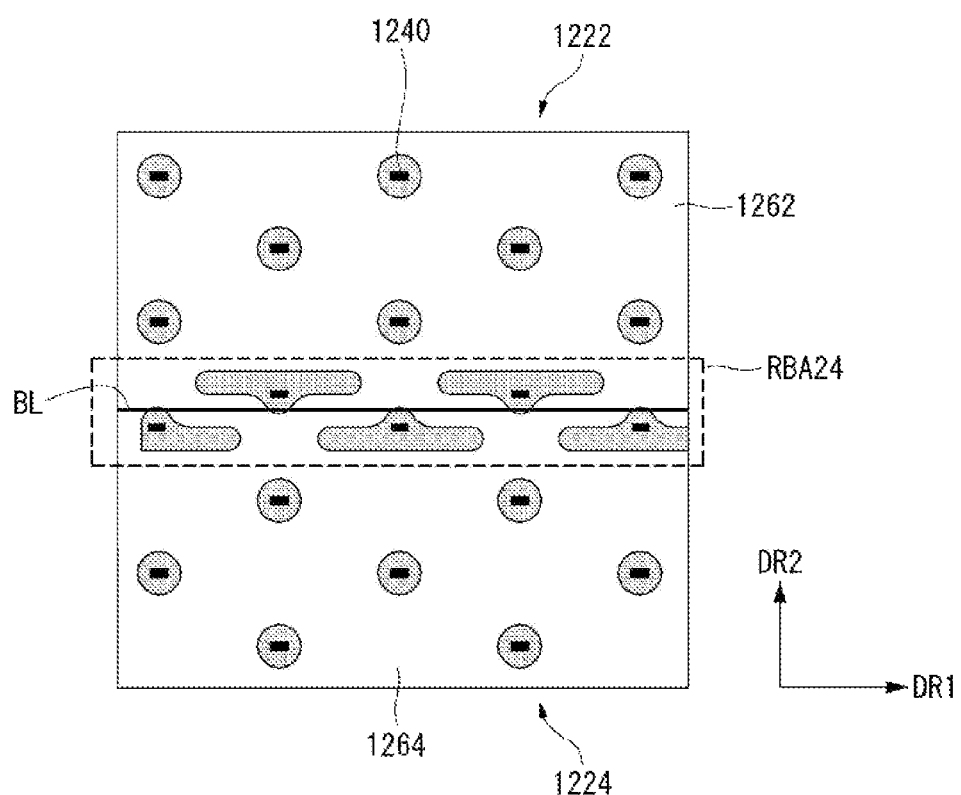

[Figure 18]
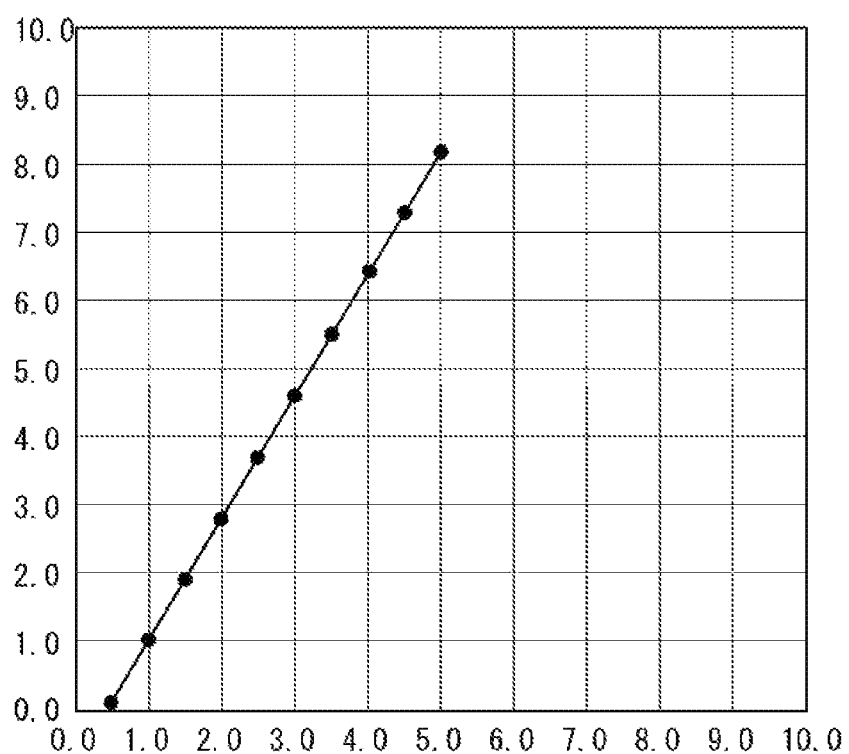

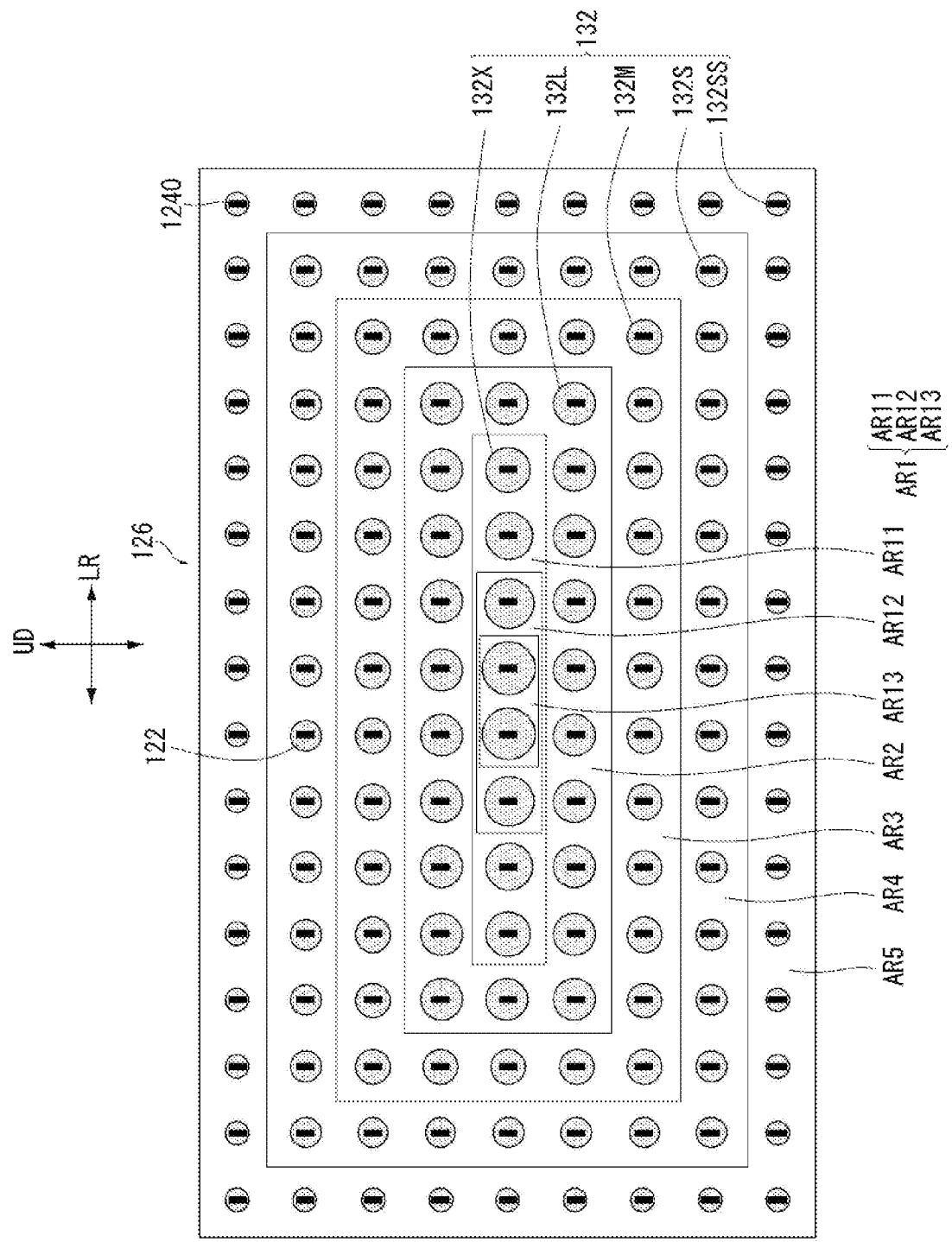
[Figure 19]

DISPLAY DEVICE

CROSS-REFERENCE TO RELATED APPLICATIONS

This application is the National Stage filing under 35 U.S.C. 371 of International Application No. PCT/KR2018/005391, filed on May 10, 2018, which claims the benefit of earlier filing date and right of priority to Korean Application No. 10-2018-0022826, filed on Feb. 26, 2018, the contents of which are all hereby incorporated by reference herein in their entirety.

TECHNICAL FIELD

The present disclosure relates to a display device.

BACKGROUND ART

With the development of the information society, various demands for display devices are increasing. Various display devices such as a liquid crystal display (LCD), a plasma display panel (PDP), an electroluminescent display (ELD), and a vacuum fluorescent display (VFD) have been recently studied and used in response to the various demands for the display devices.

Out of the display devices, a liquid crystal display panel of the LCD includes a liquid crystal layer and a TFT substrate and a color filter substrate that are opposite to each other with the liquid crystal layer interposed between them, and can display an image using light provided by a backlight unit.

DISCLOSURE

Technical Problem

An object of the present disclosure is to address the above-described and other problems. Another object of the present disclosure is to improve image quality of a display device.

Another object of the present disclosure is to improve light uniformity of a display device.

Another object of the present disclosure is to improve reliability of a light source of a display device.

Another object of the present disclosure is to improve the ease of assembly of a display device.

Technical Solution

To achieve the above-described and other objects, in one aspect, there is provided a display device comprising a display panel; a first substrate positioned in a rear of the display panel; a second substrate positioned in the rear of the display panel and adjacent to the first substrate; a plurality of first light sources mounted on the first substrate and configured to provide light to the display panel; a plurality of second light sources mounted on the second substrate and configured to provide light to the display panel; and a first reflective sheet positioned on the first substrate, the first reflective sheet including a plurality of first holes formed corresponding to positions of the plurality of first light sources, wherein in the plurality of first holes, an area of a first hole formed corresponding to a position of a first light source close to a boundary of the first substrate and the second substrate is greater than an area of a second hole formed corresponding to a position of a second light source far from the boundary of the first substrate and the second substrate.

According to another aspect, the display device may further comprise a second reflective sheet positioned on the second substrate, the second reflective sheet including a plurality of second holes formed corresponding to positions of the plurality of second light sources. In the plurality of second holes, an area of a third hole formed corresponding to a position of a third light source close to the boundary of the first substrate and the second substrate may be greater than an area of a fourth hole formed corresponding to a position of a fourth light source far from the boundary of the first substrate and the second substrate.

According to another aspect, a first direction parallel to the boundary of the first substrate and the second substrate and a second direction perpendicular to the first direction are defined. Along the second direction, a distance between the first light source and the second light source may be greater than a distance between the first light source and the third light source.

According to another aspect, along the second direction, a distance between the third light source and the fourth light source may be greater than a distance between the third light source and the first light source.

According to another aspect, along the first direction, a distance between the first light source and the second light source may be the same as a distance between the first light source and the third light source.

According to another aspect, along the first direction, a distance between the third light source and the fourth light source may be the same as a distance between the third light source and the first light source.

According to another aspect, the first hole or the third hole may include a first part extending in the first direction; and a second part extending in the second direction.

According to another aspect, a length of the first part may be greater than a length of the second part.

According to another aspect, the first light source may be positioned in the second part of the first hole, and the third light source may be positioned in the second part of the third hole.

According to another aspect, a shape of the first hole may be symmetrical to a shape of the third hole with respect to the boundary of the first substrate and the second substrate.

Advantageous Effects

Effects of a display device according to the present disclosure are described as follows.

According to at least one aspect of the present disclosure, the present disclosure can improve image quality of a display device.

According to at least one aspect of the present disclosure, the present disclosure can improve reliability of a light source of a display device.

According to at least one aspect of the present disclosure, the present disclosure can improve the ease of assembly of a display device.

Additional scope of applicability of the present disclosure will become apparent from the detailed description given blow. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

DESCRIPTION OF DRAWINGS

FIGS. 1 to 3 illustrate examples of a display device according to an embodiment of the present disclosure.

FIG. 4 illustrates an example of a light source according to an embodiment of the present disclosure.

FIGS. 5 and 6 illustrate examples of a substrate according to an embodiment of the present disclosure.

FIGS. 7 to 16 illustrate examples of a hole of a reflective sheet according to an embodiment of the present disclosure.

FIGS. 17 and 18 illustrate examples of an area of holes of a reflective sheet according to an embodiment of the present disclosure.

FIG. 19 illustrates an example of holes of a reflective sheet according to an embodiment of the present disclosure.

MODE FOR INVENTION

Reference will now be made in detail to embodiments of the disclosure, examples of which are illustrated in the accompanying drawings. Wherever possible, the same reference numbers will be used throughout the drawings to refer to the same or like parts.

In general, a suffix such as "module" and "unit" may be used to refer to elements or components. Use of such a suffix herein is merely intended to facilitate description of the present disclosure, and the suffix itself is not intended to give any special meaning or function. It will be noted that a detailed description of known arts will be omitted if it is determined that the detailed description of the known arts can obscure the embodiments of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following description, embodiments of the present disclosure are described using a liquid crystal display (LCD) panel as an example of a display panel, but are not limited thereto. Other display panels may be used. For example, a plasma display panel (PDP), a field emission display (FED) panel, and an organic light emitting diode (OLED) display may be used.

Referring to FIG. 1, a display device may include a first long side LS1, a second long side LS2 opposite the first long side LS1, a first short side SS1 adjacent to the first long side LS1 and the second long side LS2, and a second short side SS2 opposite the first short side SS1.

In embodiments disclosed herein, the first short side SS1 may be referred to as a first side area, the second short side SS2 may be referred to as a second side area opposite the first side area, the first long side LS1 may be referred to as a third side area which is adjacent to the first side area and the second side area and is positioned between the first side area and the second side area, and the second long side LS2 may be referred to as a fourth side area which is adjacent to the first side area and the second side area, is positioned between the first side area and the second side area, and is opposite to the third side area.

Embodiments of the present disclosure illustrate and describe that lengths of the first and second long sides LS1 and LS2 are longer than lengths of the first and second short sides SS1 and SS2 for convenience of explanation. However, the lengths of the first and second long sides LS1 and LS2 may be almost equal to the lengths of the first and second short sides SS1 and SS2.

Further, a first direction DR1 may be a direction parallel to the short sides SS1 and SS2 of the display device, and a second direction DR2 may be a direction parallel to the long sides LS1 and LS2 of the display device. A third direction DR3 may be a direction perpendicular to the first direction DR1 and/or the second direction DR2. The first direction DR1 and the second direction DR2 may be commonly referred to as a horizontal direction. Further, the third direction DR3 may be referred to as a vertical direction.

In addition, a side or a surface, on which the display device displays an image, may be referred to as a front side or a front surface. When the display device displays the image, a side or a surface, at which the image cannot be observed, may be referred to as a rear side or a rear surface. When the display device is observed at the front side or the front surface, the first long side LS1 may be referred to as a right side or a right surface. In the same manner, the second long side LS2 may be referred to as a left side or a left surface. In the same manner, the first short side SS1 may be referred to as an upper side or an upper surface, and the second short side SS2 may be referred to as a lower side or a lower surface.

The first long side LS1, the second long side LS2, the first short side SS1, and the second short side SS2 may be referred to as edges of the display device. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1, a position where the first long side LS1 and the second short side SS2 meet each other may be referred to as a second corner C2, a position where the second short side SS2 and the second long side LS2 meet each other may be referred to as a third corner C3, and a position where the second long side LS2 and the first short side SS1 meet each other may be referred to as a fourth corner C4.

In embodiments disclosed herein, a direction from the first short side SS1 to the second short side SS2 or a direction from the second short side SS2 to the first short side SS1 may be referred to as an up-down direction UD. A direction from the first long side LS1 to the second long side LS2 or from the second long side LS2 to the first long side LS1 may be referred to as a left-right direction LR.

Referring to FIGS. 2 and 3, a display device 100 may include a front cover 105, a display panel 110, a backlight unit 120, and a module cover 130. The module cover 130 may also be called a frame 130. (도 1, 2에서는 '10'으로 표시됨, 확인요망)

The front cover 105 may cover at least a portion of a front surface and a side surface of the display panel 110. The front cover 105 may have a rectangular frame shape, in which a center portion is empty. Because the center portion of the front cover 105 is empty, an image on the display panel 110 may be displayed to the outside.

The front cover 105 may include a front cover and a side cover. That is, the front cover 105 may be divided into the front cover positioned at the front surface of the display panel 110 and the side cover positioned at the side surface of the display panel 110. The front cover and the side cover may be separately configured. One of the front cover and the side cover may be omitted.

A display module 100 may include the display panel 110. The display panel 110 may be provided in front of the display module 100 and may display an image. The display panel 110 may divide an image into a plurality of pixels and may output the image while controlling color, brightness, and chroma of each pixel. The display panel 110 may be divided into an active area on which the image is displayed, and an inactive area on which the image is not displayed. The display panel 110 may include a front substrate and a rear substrate that are positioned opposite each other with a liquid crystal layer interposed between them.

The front substrate may include a plurality of pixels each including red (R), green (G), and blue (B) subpixels. The front substrate may generate an image corresponding to red, green, or blue color in response to a control signal.

The rear substrate may include switching elements. The rear substrate may switches on or off pixel electrodes. For example, the pixel electrodes may change a molecule arrangement of the liquid crystal layer in response to a control signal applied from the outside. The liquid crystal layer may include a plurality of liquid crystal molecules. The arrangement of the liquid crystal molecules may be changed depending on a voltage difference between the pixel electrode and a common electrode. The liquid crystal layer may transmit light provided by the backlight unit 120 to the front substrate.

The backlight unit 120 may be positioned at a rear surface of the display panel 110. The backlight unit 120 may include a plurality of light sources. The light sources of the backlight unit 120 may be arranged in a direct type.

The backlight unit 120 may be coupled to a front surface of the frame 130. For example, the plurality of light sources may be disposed on the front surface of the frame 130. In this instance, the backlight unit 120 may be commonly called a direct type backlight unit.

The backlight unit 120 may be driven in an entire driving method or a partial driving method, such as a local dimming method and an impulsive driving method. The backlight unit 120 may include an optical sheet 125 and an optical layer 123. The optical layer 123 may also be called an optical unit 123.

The optical sheet 125 may allow light of the light sources to be uniformly transmitted to the display panel 110. The optical sheet 125 may include a plurality of layers. For example, the optical sheet 125 may include at least one prism sheet and/or at least one diffusion sheet.

The optical sheet 125 may further include a coupling portion 125d. The coupling portion 125d may be coupled to the front cover 105 and/or the frame 130. Alternatively, the coupling portion 125d may be coupled to a structure coupled on the front cover 105 and/or the frame 130.

The optical layer 123 may include the light source, etc. The detailed configuration of the optical layer 123 will be described in the corresponding paragraphs.

The frame 130 may function to support the components constituting the display device. For example, the components such as the backlight unit 120 may be coupled to the frame 130. The frame 130 may be formed of a metal material such as an aluminum alloy.

Alternatively, the frame 130 may be positioned at a rear surface of the display device. The frame 130 may protect the internal configuration of the display device 100 from the outside. At least a portion of the frame 130 may be coupled to the front cover 105. The frame 130 may be an injection of a resin material.

The backlight unit 120 may include the optical layer 123 including a substrate 122, at least one light assembly 124, a reflective sheet 126, and a diffusion plate 129, and the optical sheet 125 positioned at a front surface of the optical layer 123.

The substrate 122 may be configured as a plurality of straps, which is extended in the first direction and is spaced apart from each other at predetermined intervals in the second direction perpendicular to the first direction.

At least one light assembly 124 may be mounted on the substrate 122. The substrate 122 may have an electrode pattern for connecting an adaptor to the light assembly 124. For example, a carbon nanotube electrode pattern for connecting the adaptor to the light assembly 124 may be formed on the substrate 122.

The substrate 122 may be formed of at least one of polyethylene terephthalate (PET), glass, polycarbonate (PC), and silicon. The substrate 122 may be a printed circuit board (PCB) on which at least one light assembly 124 is mounted.

The light assembly 124 may be disposed on the substrate 122 at a predetermined distance in the first direction. A diameter of the light assembly 124 may be greater than a width of the substrate 122. That is, the diameter of the light assembly 124 may be greater than a length of the substrate 122 in the second direction.

The light assembly 124 may be a light emitting diode (LED) chip or a LED package including at least one LED chip.

The light assembly 124 may be configured as a colored LED emitting at least one of red, green, and blue light or a white LED. The colored LED may include at least one of a red LED, a green LED, and a blue LED.

A light source included in the light assembly 124 may be, for example, a COB (chip-on board) type. The COB light source may be configured such that an LED chip as the light source is directly coupled to the substrate 122. Thus, the COB light source can simplify the process. Further, this can reduce a resistance, and hence can reduce a loss of energy resulting from heat. That is, this can increase power efficiency of the light assembly 124. In addition, the COB light source can provide the brighter lighting and can be implemented to be thinner and lighter than the related art.

The reflective sheet 126 may be positioned at a front surface of the substrate 122. The reflective sheet 126 may be positioned in an area excluding a formation area of the light assembly 124 of the substrate 122. That is, the reflective sheet 126 may have a plurality of holes 132.

The reflective sheet 126 may reflect light emitted from the light assembly 124 to the front. Further, the reflective sheet 126 may again reflect light reflected from the diffusion plate 129.

The reflective sheet 126 may include at least one of metal and metal oxide, each of which is a reflection material. The reflective sheet 126 may include metal and/or metal oxide having a high reflectance, for example, at least one of aluminum (Al), silver (Ag), gold (Au), and titanium dioxide ($TiO_2$).

The reflective sheet 126 may be formed by depositing and/or coating metal or metal oxide on the substrate 122. An ink including a metal material may be printed on the reflective sheet 126. The reflective sheet 126 may include a deposition layer formed using a heat deposition method, an evaporation method, or a vacuum deposition method such as a sputtering method. The reflective sheet 126 may include a coating layer and/or a printing layer formed using a printing method, a gravure coating method or a silk screen method.

An air gap may be positioned between the reflective sheet 126 and the diffusion plate 129. The air gap may serve as a buffer capable of widely spreading light emitted from the light assembly 124. A supporter 131 may be positioned between the reflective sheet 126 and the diffusion plate 129 to keep the air gap.

A resin may be deposited on the light assembly 124 and/or the reflective sheet 126. The resin may function to diffuse light emitted from the light assembly 124. The diffusion plate 129 may upwardly diffuse light emitted from the light assembly 124.

The optical sheet 125 may be positioned at a front surface of the diffusion plate 129. A rear surface of the optical sheet 125 may be adhered to the diffusion plate 129, and a front surface of the optical sheet 125 may be adhered to the rear surface of the display panel 110 (see FIG. 2).

The optical sheet 125 may include at least one sheet. The optical sheet 125 may include one or more prism sheets and/or one or more diffusion sheets. A plurality of sheets included in the optical sheet 125 may be in an adhesive and/or adhered state.

The optical sheet 125 may include a plurality of sheets having different functions. For example, the optical sheet 125 may include first to third optical sheets 125a to 125c. The first optical sheet 125a may function as a diffusion sheet, and the second and third optical sheets 125b and 125c may function as a prism sheet. The number and/or position of the diffusion sheets and the prism sheets may be changed. For example, the optical sheet 125 may include the first optical sheets 125a as the diffusion sheet and the second optical sheet 125b as the prism sheet.

The diffusion sheet can prevent light coming from the diffusion plate 129 from being partially concentrated and can more uniformly distribute light. The prism sheet can concentrate light coming from the diffusion sheet and can allow light to be vertically incident on the display panel 110.

The coupling portion 125d may be formed on at least one of edges of the optical sheet 125. The coupling portion 125d may be formed on at least one of the first to third optical sheets 125a to 125c.

The coupling portion 125d may be formed at an edge of a long side of the optical sheet 125. The coupling portion 125d on a first long side and the coupling portion 125d on a second long side may be asymmetric. For example, the number and/or position of the coupling portions 125d on the first long side may be different from the number and/or position of the coupling portions 125d on the second long side.

Referring to FIG. 4, a light source 1240 may be, for example, a LED package. The light source 1240 may include a LED chip 1241 and an encapsulant 1243. For example, the LED chip 1241 may have a thickness T1 of 200 μm. The encapsulant 1243 may include a fluorescent substance. For example, the LED chip 1241 may be a blue LED, and the fluorescent substance included in the encapsulant 1243 may be a yellow-based or red-based fluorescent substance. Hence, the light source 1240 may provide white light. For example, the encapsulant 1243 may have a thickness T2 of 200 μm. The encapsulant 1243 may surround the LED chip 1241.

Referring to FIGS. 5 and 6, the substrate 122 may be a flat plate. The substrate 122 may include a plurality of substrates. The plurality of substrates 122 may be disposed adjacent to each other. A second substrate 1222 may be disposed on the right side of a first substrate 1221, a third substrate 1223 may be disposed under the first substrate 1221, and a fourth substrate 1224 may be disposed under the substrate 1222 and on the right side of the third substrate 1223.

The plurality of light sources 1240 may be mounted on the first substrate 1221. The plurality of light sources 1240 may be disposed on the first substrate 1221 while maintaining a constant distance. The plurality of light sources 1240 may be disposed on the second substrate 1222 while maintaining a constant distance. The plurality of light sources 1240 may be disposed on the third substrate 1223 while maintaining a constant distance. The plurality of light sources 1240 may be disposed on the fourth substrate 1224 while maintaining a constant distance.

The plurality of light sources 1240 may be disposed at the same distance from each other in the first to fourth substrates 1221 to 1224. In other words, the plurality of light sources 1240 disposed on one substrate 122 may maintain a constant distance from each other.

For example, in the second substrate 1222, first direction distances D21 of the plurality of light sources 1240 may be constant to each other, and second direction distances D22 of the plurality of light sources 1240 may be constant to each other. In addition, in the fourth substrate 1224, first direction distances D41 of the plurality of light sources 1240 may be constant to each other, and second direction distances D42 of the plurality of light sources 1240 may be constant to each other.

A boundary area between the first substrate 1221 and the second substrate 1222 may be called a 12th boundary area BA12, a boundary area between the first substrate 1221 and the third substrate 1223 may be called a 13th boundary area BA13, a boundary area between the second substrate 1222 and the fourth substrate 1224 may be called a 24th boundary area BA24, and a boundary area between the third substrate 1223 and the fourth substrate 1224 may be called a 34th boundary area BA34.

For example, in the 24th boundary area BA24, a distance DB24 between the light source 1240 on the second substrate 1222 and the light source 1240 on the fourth substrate 1224 may be less than a distance D42 or a distance D22. That is, in the 24th boundary area BA24, a second direction distance DB24 between the light source 1240 on the second substrate 1222 and the light source 1240 on the fourth substrate 1224 may be less than a second direction distance D22 between the light sources 1240 on the second substrate 1222 or a second direction distance D42 between the light sources 1240 on the fourth substrate 1224. This can inhibit light uniformity of the display device.

Referring to FIGS. 7 to 11, the reflective sheet 126 may include holes 132. The holes 132 of the reflective sheet 126 may be formed by perforating the reflective sheet 126 in various shapes. The holes 132 of the reflective sheet 126 may be positioned corresponding to the light sources 1240. The holes 132 described by way of example in FIGS. 7 to 11 may be called inner holes 132.

Referring to FIGS. 12 to 14, the reflective sheet 126 may include holes 132. The holes 132 of the reflective sheet 126 may be formed by perforating the reflective sheet 126 in various shapes. The holes 132 of the reflective sheet 126 may be positioned corresponding to the light sources 1240. The holes 132 described by way of example in FIGS. 12 to 14 may be called outer holes 132.

Referring to FIG. 12, the hole 132 may include a first part 1321 and a second part 1322. The second part 1322 may be a rectangle extending in the second direction DR2. The first part 1321 may be a rectangle extending in the first direction DR1. A length of the first part 1321 may be greater than a length of the second part 1322. A width of the first part 1321 may be the same as a width of the second part 1322. The light source 1240 may be positioned in the second part 1322.

Referring to FIG. 13, the hole 132 may include a first part 1321, a second part 1322, and a third part 1323. The first part 1321 and/or the third part 1323 may be a rectangle extending in the first direction DR1. The second part 1322 may be a rectangle extending in the second direction DR2. A length of the first part 1321 may be the same as a length of the third part 1323. A length of the second part 1322 may be less than the length of the first part 1321 or the length of the third part 1323. Widths of the first to third parts 1321 to 1323 may be the same. The light source 1240 may be positioned in the second part 1322.

Referring to FIG. 14, the hole 132 may include a first part 1321 and a second part 1322. The second part 1322 may be a rectangle extending in the second direction DR2. The first part 1321 may be a rectangle extending in the first direction DR1. A length of the first part 1321 may be greater than a length of the second part 1322. A width of the first part 1321 may be the same as a width of the second part 1322. The light source 1240 may be positioned at an intersection of the first part 1321 and the second part 1322.

Referring to FIG. 15, the reflective sheet 126 may include a center hole 1321, a middle hole 1322, and an outer hole 1323. The center hole 1321 may be positioned in the light source 1240. The middle hole 1322 may include a plurality of middle holes. The plurality of middle holes 1322 may be positioned around the center hole 1321. The outer hole 1323 may include a plurality of outer holes. The plurality of outer holes 1323 may be positioned around the middle holes 1322. An inner area AR1 may be formed around or outside the center hole 1321, and an outer area AR2 may be formed outside the inner area AR1.

For example, a size of the middle holes 1322 formed in the inner area AR1 may be greater than a size of the outer holes 1323 formed in the outer area AR2. As another example, a sum of areas of the middle holes 1322 formed in the inner area AR1 may be greater than areas of the outer holes 1323 formed in the outer area AR2.

In other words, the number or number density of the outer holes 1323 may be greater than the number or number density of the middle holes 1322, but an area density of the outer holes 1323 may be less than an area density of the middle holes 1322.

Hence, a reflection area of the reflective sheet 126 may decrease as it becomes closer to the light source 1240, and the reflection area of the reflective sheet 1240 may increase as it is farther from the light source 1240.

Referring to FIG. 16, the reflective sheet 126 may include a center hole 1321, a middle hole 1322, and an outer hole 1323. The center hole 1321 may be positioned in the light source 1240. The middle hole 1322 may include a plurality of middle holes. The plurality of middle holes 1322 may be positioned around the center hole 1321. The outer hole 1323 may include a plurality of outer holes. The plurality of outer holes 1323 may be positioned around the middle holes 1322. An inner area AR1 may be formed around or outside the center hole 1321, and an outer area AR2 may be formed outside the inner area AR1.

For example, a size of the middle holes 1322 formed in the inner area AR1 may be the same as a size of the outer holes 1323 formed in the outer area AR2. In this instance, the number of middle holes 1322 may be the same as the number of outer holes 1323. However, a reflection area of the outer area AR2 may be greater than a reflection area of the inner area AR1.

Hence, a reflection area of the reflective sheet 126 may decrease as it becomes closer to the light source 1240, and the reflection area of the reflective sheet 1240 may increase as it is farther from the light source 1240.

FIG. 17 illustrates an example of a substrate and a boundary area of the substrate. The contents described with reference to FIG. 17 can be applied to other boundary areas.

Referring to FIG. 17, a second reflective sheet 1262 may be placed on a second substrate 1222. A fourth reflective sheet 1264 may be placed on a fourth substrate 1224. A boundary BL where the second reflective sheet 1262 meets the fourth reflective sheet 1264 may be formed on the 24th boundary area BA24. A boundary area of the reflective sheets 1262 and 1264 formed on the 24th boundary area BA24 may be called a 24th reflective sheet boundary area RBA24.

The second reflective sheet 1262 may be placed on the second substrate 1222. A plurality of inner holes 1321 may be positioned on the plurality of light sources 1240. For example, the plurality of inner holes 1321 may be circular. A plurality of outer holes 1320 may be positioned on the plurality of light sources 1240 positioned on the 24th boundary area BA24.

The second reflective sheet 1262 may include a plurality of outer holes 1320. First parts 1321 of the plurality of outer holes 1320 may be parallel to a boundary line BL of the second reflective sheet 1262 and the fourth reflective sheet 1264. Second parts 1322 of the plurality of outer holes 1320 may extend from the first parts 1321 toward the boundary line BL of the second reflective sheet 1262 and the fourth reflective sheet 1264.

The fourth reflective sheet 1264 may include a plurality of outer holes 1320. First parts 1321 of the plurality of outer holes 1320 may be parallel to the boundary line BL of the second reflective sheet 1262 and the fourth reflective sheet 1264. Second parts 1322 of the plurality of outer holes 1320 may extend from the first parts 1321 toward the boundary line BL of the second reflective sheet 1262 and the fourth reflective sheet 1264.

The plurality of outer holes 1320 included in the second reflective sheet 1262 may be symmetrical to the plurality of outer holes 1320 included in the fourth reflective sheet 1264 with respect to the boundary line BL.

Referring to FIGS. 6, 17 and 18, a ratio of the area of the outer hole 1320 to the area of the inner hole 1321 may be proportional to a ratio of the distances D22 to the distance DB24.

For example, when the distances D22 is 0.5 times based on the distance DB24, the area of the outer hole 1320 may be 0.1 times the area of the inner hole 1321.

As another example, when the distances D22 is 1.0 times based on the distance DB24, the area of the outer hole 1320 may be 1.0 times the area of the inner hole 1321.

As another example, when the distances D22 is 1.5 times based on the distance DB24, the area of the outer hole 1320 may be 1.9 times the area of the inner hole 1321.

As another example, when the distances D22 is 2.0 times based on the distance DB24, the area of the outer hole 1320 may be 2.8 times the area of the inner hole 1321.

As another example, when the distances D22 is 2.5 times based on the distance DB24, the area of the outer hole 1320 may be 3.7 times the area of the inner hole 1321.

As another example, when the distances D22 is 3.0 times based on the distance DB24, the area of the outer hole 1320 may be 4.6 times the area of the inner hole 1321.

As another example, when the distances D22 is 3.5 times based on the distance DB24, the area of the outer hole 1320 may be 5.5 times the area of the inner hole 1321.

As another example, when the distances D22 is 4.0 times based on the distance DB24, the area of the outer hole 1320 may be 6.4 times the area of the inner hole 1321.

As another example, when the distances D22 is 4.5 times based on the distance DB24, the area of the outer hole 1320 may be 7.3 times the area of the inner hole 1321.

As another example, when the distances D22 is 5.0 times based on the distance DB24, the area of the outer hole 1320 may be 8.2 times the area of the inner hole 1321.

Referring to FIG. 19, the optical sheet 126 may be placed on the substrate 122. The optical sheet 126 may include a plurality of holes 132. The plurality of holes 132 may be formed on the reflective sheet 126 in correspondence to positions of the light sources 1240 mounted on the substrate 122.

The reflective sheet 126 may include a first area AR1, a second area AR2, a third area AR3, a fourth area AR4, and a fifth area AR5. The first area AR1 may be positioned in the center of the reflective sheet 126. The first area AR1 may be formed to extend along the left-right direction LR of the reflective sheet 126. The second area AR2 may surround the first area AR1 and may be formed around or outside the first area AR1. The third area AR3 may surround the second area AR2 and may be formed around or outside the second area AR2. The fourth region AR4 may surround the third region AR3 and may be formed around or outside the third region AR3. The fifth region AR5 may surround the fourth region AR4 and may be formed around or outside the fourth region AR4.

A plurality of first holes 132X may be formed corresponding to the light sources 1240 in the first area AR1 of the reflective sheet 126. A plurality of second holes 132L may be formed corresponding to the light sources 1240 in the second area AR2 of the reflective sheet 126. A plurality of third holes 132M may be formed corresponding to the light sources 1240 in the third area AR3 of the reflective sheet 126. A plurality of fourth holes 132S may be formed corresponding to the light sources 1240 in the fourth area AR4 of the reflective sheet 126. A plurality of fifth 132SS may be formed corresponding to the light sources 1240 in the fifth area AR5 of the reflective sheet 126.

A size of the plurality of second holes 132L may be less than a size of the plurality of first holes 132X. A size of the plurality of third holes 132M may be less than a size of the plurality of second holes 132L. A size of the plurality of fourth holes 132S may be less than a size of the plurality of third holes 132M. A size of the plurality of fifth holes 132SS may be less than a size of the plurality of fourth holes 132S.

The first area AR1 may include an eleventh area AR11, a twelfth area AR12, and a thirteenth area AR13. The holes positioned in the thirteenth area AR13 may be larger than the holes positioned in the twelfth area AR12. The holes positioned in the twelfth area AR12 may be larger than the holes positioned in the eleventh area AR11.

The holes 132 formed in the reflective sheet 126 can locally reduce an intensity and/or an amount of light that is provided by the light sources 1240 and is reflected from the reflective sheet 126. Hence, the present disclosure can uniformly distribute and provide light to the display panel.

For example, configuration "A" described in a specific embodiment and/or the drawings and configuration "B" described in another embodiment and/or the drawings can be combined with each other. That is, even if the combination between the configurations is not directly described, the combination is possible except where the combination is not possible.

Some embodiments or other embodiments of the present disclosure described above are not mutually exclusive or distinct from each other. Configurations or functions of some embodiments or other embodiments of the present disclosure described above can be used together or combined with each other.

The above detailed description is merely an example and should not be to be understood as limiting the present disclosure. The scope of the present disclosure should be determined by rational interpretation of the appended claims, and all modifications within the equivalent range of the present disclosure are included in the scope of the present disclosure.

The invention claimed is:

1. A display device comprising:
    a display panel;
    a first substrate positioned in a rear of the display panel;
    a second substrate positioned in the rear of the display panel and adjacent to the first substrate;
    a plurality of first light sources mounted on the first substrate and configured to provide light to the display panel;
    a plurality of second light sources mounted on the second substrate and configured to provide light to the display panel; and
    a first reflective sheet positioned on the first substrate, the first reflective sheet including a plurality of first holes formed corresponding to positions of the plurality of first light sources,
    wherein in the plurality of first holes, an area of a first hole formed corresponding to a position of a first light source close to a boundary of the first substrate and the second substrate is greater than an area of a second hole formed corresponding to a position of a second light source far from the boundary of the first substrate and the second substrate.

2. The display device of claim 1, further comprising a second reflective sheet positioned on the second substrate, the second reflective sheet including a plurality of second holes formed corresponding to positions of the plurality of second light sources,
    wherein in the plurality of second holes, an area of a third hole formed corresponding to a position of a third light source close to the boundary of the first substrate and the second substrate is greater than an area of a fourth hole formed corresponding to a position of a fourth light source far from the boundary of the first substrate and the second substrate.

3. The display device of claim 2, wherein a first direction parallel to the boundary of the first substrate and the second substrate and a second direction perpendicular to the first direction are defined,
    wherein along the second direction, a distance between the first light source and the second light source is greater than a distance between the first light source and the third light source.

4. The display device of claim 3, wherein along the second direction, a distance between the third light source and the fourth light source is greater than a distance between the third light source and the first light source.

5. The display device of claim 4, wherein along the first direction, a distance between the first light source and the second light source is the same as a distance between the first light source and the third light source.

6. The display device of claim 5, wherein along the first direction, a distance between the third light source and the fourth light source is the same as a distance between the third light source and the first light source.

7. The display device of claim 6, wherein the first hole or the third hole includes:
   a first part extending in the first direction; and
   a second part extending in the second direction.

8. The display device of claim 7, wherein a length of the first part is greater than a length of the second part.

9. The display device of claim 8, wherein the first light source is positioned in the second part of the first hole,
   wherein the third light source is positioned in the second part of the third hole.

10. The display device of claim 8, wherein a shape of the first hole is symmetrical to a shape of the third hole with respect to the boundary of the first substrate and the second substrate.

\* \* \* \* \*